United States Patent
Deane (10) Patent No.: US 6,802,653 B2
(45) Date of Patent: Oct. 12, 2004

(54) METHOD AND APPARATUS FOR ADAPTING A MINIATURE FORM-FACTOR CONNECTOR TO A STANDARD FORMAT FIBER OPTIC CONNECTOR PLUG

(75) Inventor: Peter Deane, Los Altos, CA (US)

(73) Assignee: National Semiconductor Corporation, Santa Clara, CA (US)

(*) Notice: Subject to any disclaimer, the term of this patent is extended or adjusted under 35 U.S.C. 154(b) by 318 days.

(21) Appl. No.: 10/041,805

(22) Filed: Jan. 7, 2002

(65) Prior Publication Data

US 2003/0087505 A1 May 8, 2003

Related U.S. Application Data

(63) Continuation of application No. 09/713,367, filed on Nov. 14, 2000, now Pat. No. 6,497,518.

(51) Int. Cl.[7] .................................................. G02B 6/36
(52) U.S. Cl. .............................. 385/88; 385/89; 385/53; 385/76; 385/77; 385/139
(58) Field of Search ............................ 385/53, 56, 76, 385/77, 88, 89, 92, 114, 139, 14, 49

(56) References Cited

U.S. PATENT DOCUMENTS

| | | | | | |
|---|---|---|---|---|---|
| 5,199,093 | A | * | 3/1993 | Longhurst | 385/88 |
| 5,293,581 | A | * | 3/1994 | DiMarco | 385/76 |
| 5,325,455 | A | * | 6/1994 | Henson et al. | 385/89 |
| 5,333,221 | A | * | 7/1994 | Briggs et al. | 385/55 |
| 5,487,124 | A | * | 1/1996 | Bowen et al. | 385/93 |
| 5,561,727 | A | * | 10/1996 | Akita et al. | 385/88 |
| 5,778,130 | A | * | 7/1998 | Walters et al. | 385/134 |
| 6,076,977 | A | * | 6/2000 | Akikuni | 385/88 |
| 6,305,848 | B1 | * | 10/2001 | Gregory | 385/53 |
| 6,318,909 | B1 | * | 11/2001 | Giboney et al. | 385/90 |
| 6,497,518 | B1 | * | 12/2002 | Deane | 385/92 |

OTHER PUBLICATIONS

Deane, "Method and Apparatus for Adapting a Miniature . . .", U.S. pantent application Publication No. U.S. 2003/0087505 A1, published May 8, 2003.*

* cited by examiner

Primary Examiner—Brian Healy
(74) Attorney, Agent, or Firm—Beyer Weaver & Thomas, LLP (57) ABSTRACT

Embodiments of the invention include a method and adaptor apparatus for optically connecting optical fibers of a standard ferrule based parallel multi-mode fiber format plug with photonic devices of a connector sleeve arranged in accordance with a miniature form factor format. The adaptor includes an adaptor jacket having a first end that is optically connected to a second end. The first end is configured to receive a connector plug having optical fibers arranged in a standard ferrule based parallel multi-mode fiber format. The second end is formatted for connection with a miniature form factor connector sleeve having an optical subassembly fitted thereon. Thus, the photonic devices of an optical subassembly arranged in the miniature form factor format can be optically coupled, via the adaptor jacket, to corresponding optical fibers of the connector plug arranged in a standard ferrule based parallel multi-mode fiber format.

21 Claims, 8 Drawing Sheets

METHOD AND APPARATUS FOR ADAPTING A MINIATURE FORM-FACTOR CONNECTOR TO A STANDARD FORMAT FIBER OPTIC CONNECTOR PLUG

CROSS-REFERENCE TO RELATED APPLICATIONS

This application is a continuation application claiming priority to U.S. patent application Ser. No. 09/713,367, now U.S. Pat. No. 6,497,518 entitled "Miniature Opto-Electric Transceiver," by Peter Deane, filed on Nov. 14, 2000.

This application is also related to the following U.S. Patent documents:

U.S. patent application Ser. No. 09/568,094, now U.S. Pat. No. 6,364,542, entitled, "Device And Method For Providing A True Semiconductor Die To External Fiber Optic Cable Connection," by Deane et al., filed on May 9, 2000;

U.S. patent application Ser. No. 09/568,558, pending, entitled "Arrayable, Scalable And Stackable Molded Package Configuration," by Nguyen et al., filed on May 9, 2000;

U.S. patent application Ser. No. 09/922,358, pending, entitled "Miniature Semiconductor Package For Opto-Electronic Devices," by Nguyen et al., filed on Aug. 3, 2001;

U.S. patent application Ser. No. 09/922,598, pending, entitled "Techniques For Joining An Opto-Electronic Module To A Semiconductor Package," by Nguyen et al., filed on Aug. 3, 2001;

U.S. patent application Ser. No. 09/922,357, pending, entitled "Optoelectronic Package With Dam Structure To Provide Fiber Standoff", by Nguyen et al., filed on Aug. 3, 2001;

U.S. patent application Ser. No. 10/165,711, entitled "Ceramic Optical Sub-Assembly For Opto-Electronic Modules", by Liu et al., filed on Jun. 6, 2002;

U.S. patent application Ser. No. 10/165,553, entitled "Optical Sub-Assembly For Opto-Electronic Modules", by Lui et al.; and to U.S. patent application Ser. No. 10/165,548, entitled: "Techniques For Attaching Rotated Photonic Devices to an Optical Sub-Assembly in an Optoelectronic Package", by Nguyen et al., filed on Jun. 6, 2002, the content of each of which are hereby incorporated by reference.

FIELD OF THE INVENTION

The invention described herein relates to method and apparatus for interconnecting a standard format fiber optic connector plug to a sleeve based connector to facilitate the connection of optical fibers with electro-optic systems.

BACKGROUND OF THE INVENTION

Due to increasing needs for bandwidth, modern computer and communication networks are placing increasing reliance on optical signal transmission through fiber optic cabling. With fiber optic cabling, data is transmitted using light signals, not electrical signals. For example, a logical "1" may be represented by a light pulse of a specific duration and a logical "0" may be represented by the absence of a light pulse for the same duration. In addition, it is also possible to transmit at the same time multiple colors of light over a single strand of optic fiber, with each color of light representing a distinct data stream.

While fiber optic cabling is very efficient for transferring data, such light signals can not, as yet, be effectively used to process data. Therefore, many existing networks use fiber optics for transmitting data between nodes and silicon chips for processing the data electronically within the nodes.

Electro-optic circuitry, such as fiber optic transceivers, which convert light signals from a fiber optic cable into electrical signals, and vice versa, are used as the interface between a fiber optic line and a computer node. A typical transceiver includes a substrate and one or more electro-optic (also referred to as opto-electronic) semiconductor devices mounted on the substrate. These electro-optic semiconductor devices can include optical detectors for converting light signals received over the fiber optic cables into electrical signals or optical emitters for converting electrical signals from the semiconductor devices into light signals. Such electro-optic devices are referred to herein as photonic devices. Typical examples include, but are not limited to optical emitters (e.g. laser devices) and optical receivers. These photonic devices can be incorporating into a varying array of optical transmitters, receivers, and transceivers. Such devices are widely available. For example, a number of fiber optic transceivers are commercially available from Hewlett Packard, AMP, Sumitomo, Nortel, and Siemens.

In order to efficiently route and interface optical signals with the photonic devices of the nodes, optical fibers are in optical communication with opto-electronic devices at the nodes. Commonly, the opto-electronic devices are arranged on a connector apparatus to facilitate the easy interconnection of the opto-electronic devices with the optical fibers. In common usage, the opto-electronic devices include photonic devices arranged relative to a connector apparatus in a specified configuration which is in accord with one of a number of standard configurations. Such configurations are referred to herein as formats. By configuring the photonic devices of an opto-electronic device and connector in accord with one of the common formats, any optical fiber arrangement configured in accordance with the same format can be interconnected to a corresponding opto-electronic device. Such optical fibers are appropriately arranged in a specific format and bundled together in a connector plug having the desired format.

A brief description of some standard formats follows. Generally, optical fibers are bundled together and held in a ferrule. A ferrule is mechanical fixture used to protect and align the fibers in a connector. Commonly, such ferrules are made of ceramic materials. One common format is a so-called MTP-format. An MTP connector is a small form factor connector that permits high density fiber solutions using US Conec MT ferrules. This format is also referred to as MPO (multiple parallel optics) format. Generally, twelve or more fibers per connector are bundled together in a small diameter cable. Another commonly used format is the MT-RJ format. The MT-RJ format is a small form factor, dual fiber connector. Another commonly used format is the MT-BP format. The MT-RJ format is a small form factor, high fiber count fiber connector (sometimes having as many as eighty fibers). In addition to the few formats described above, there is a relatively wide range of other standard ferrule-based parallel multi-mode fiber formats in common usage. Such formats are known to those having ordinary skill in the art. One of the difficulties of such formats is that they are relatively large, thereby limiting the number of fibers connectable using such formats.

National Semiconductor has developed a family of sleeve based connectors for interconnecting optical fibers to electro-optic devices. One such sleeve based connector is a miniature form factor connector which creates smaller, higher density connectors for connecting optical fibers to electro-optic devices. However, the small size and miniaturized format of such connectors make them incompatible with existing standard format connectors. As a result their exists a need for making the miniature form factor connectors backward compatible with existing legacy formats (such as MPO, MTP, MT-RJ, MT-BP, and other standard formats).

SUMMARY OF THE INVENTION

Embodiments of the invention include an adaptor apparatus for optically connecting optical fibers of a standard ferrule based parallel multi-mode fiber format plug with photonic devices of a connector sleeve arranged in accordance with a miniature form factor format. The adaptor includes an adaptor jacket having a first end and a second end, the first end being in optical communication with the second end. The first end is configured to receive a connector plug having optical fibers arranged in a standard ferrule based parallel multi-mode fiber format. The second end is formatted for connection with a miniature form factor connector sleeve having an optical subassembly fitted thereon. Thus, the photonic devices of an optical subassembly arranged in the miniature form factor format can be optically coupled, via the adaptor jacket, to corresponding optical fibers of the connector plug arranged in a standard ferrule based parallel multi-mode fiber format.

In another embodiment, the invention includes an adaptor apparatus for facilitating the optical interconnection of optical fibers arranged in a standard format connector plug with photonic devices arranged in miniature form factor format on an optical subassembly of a miniature form factor connector sleeve. The adaptor apparatus comprises an adaptor jacket having a first end and a second end. The first end of the adaptor jacket is configured to receive a standard format connector plug and the second end is configured for connection with a miniature form factor connector sleeve. The first end is optically connected to the second end using an optical ribbon containing optical fibers. The optical fibers being arranged at the second end of the adaptor jacket in accordance with a miniature form factor format to optically interface with photonic devices arranged in the same miniature form factor format and arranged at the first end of the adaptor jacket in accordance with a standard format to optically interface with optical fibers arranged in the same standard format in a connector plug, whereby the plurality of optical fibers of the optical ribbon transmit light between the photonic devices and corresponding optical fibers of the plug.

The invention further includes a method embodiment for interconnecting optical fibers carried by a connector plug arranged in a standard format with photonic devices arranged in a miniature form factor format. The method comprising providing a plug having a plurality of optical fibers arranged in accordance with a standard format and providing a connector having a plurality of photonic devices arranged in accordance with a miniature form factor format. The method further includes providing an adaptor having a first optical interface configured to optically connect with the plug having plurality of optical fibers arranged in accordance with the standard format and having a second optical interface configured to optically connect with the with the plurality of photonic devices arranged in accordance with the miniature form factor format. The method further comprising connecting the plug to the first optical interface of the adaptor and connecting the second optical interface of the adaptor to the plurality of photonic devices of the connector.

BRIEF DESCRIPTION OF THE DRAWINGS

The following detailed description will be more readily understood in conjunction with the accompanying drawings, in which.

It is to be understood that, in the drawings, like reference numerals designate like structural elements. Also, it is understood that the depictions in the figures are not necessarily to scale.

DETAILED DESCRIPTION OF THE DRAWINGS

The present invention is described with reference to a few embodiments, as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known operations have not been described in detail so not to unnecessarily obscure the present invention.

National Semiconductor has developed a family of sleeve based connector apparatus for connecting optical fibers with electro-optic devices. Suitable examples of such sleeve-based connectors are detailed in the U.S. patent application Ser. No. 09/713,367 (Attorney Docket No. NSC1P180). entitled "Miniature Opto-Electric Transceiver," by Peter Deane, filed on Nov. 14, 2000 which is hereby incorporated by reference. One implementation of such sleeve-based connectors is a miniature form factor connector for fiber optic modules. Such connectors are used to connect optical fibers to photonic devices. A brief description of a few representative miniature form factor connector embodiments will help illustrate aspects of the invention. In the depicted embodiments the photonic devices are connected to electronic systems. As used herein, photonic devices refer to optical receivers or optical emitters (e.g., laser diodes). In some embodiments, such connectors facilitate the connection of a plurality of optical fibers to a plurality of photonic devices. Commonly the photonic devices form part of an optical sub-assembly (OSA). The OSA is an interface device for translating high-speed electrical data signals into optical data signals (and vice versa). In one embodiment an optical sub-assembly has a supporting wall with photonic devices formed thereon. The optical sub-assembly is coupled to a semiconductor chip using a semiconductor chip sub-assembly (CSA) in this way electrical signals can be converted to optical signals and vice versa. The OSA can be used to form optical-electrical modules for transceiver, transmitter, and receiver applications. Such applications include, but are not limited to, chip-to-chip, board-to-board, chassis-to-chassis, and system-to-system inter-networking.

A leadless leadframe package (LLP) implementation in electro-optic packages is advantageous because the size of the electro-optic package can be reduced. In some embodiments, the size of LLPs are approximately 0.9 mm +/− 0.1 mm in height and 7×7, 9×9.5, and 9.5×9.5 mm for the 44L, 50L, and 52L LLP designs, respectively. The small form factor of the LLPs allows a high number of the electro-optic packages to be placed next to each other so that a high launch density can be achieved. A high launch density means that a high number of optical devices can be placed within a given amount of space on a printed circuit board. The small size of the miniature form factor of the electro-optic device also allows for a transceiver device to contain multiple lasers and detectors such that a multiple channel transceiver can be formed.

Figure 1:
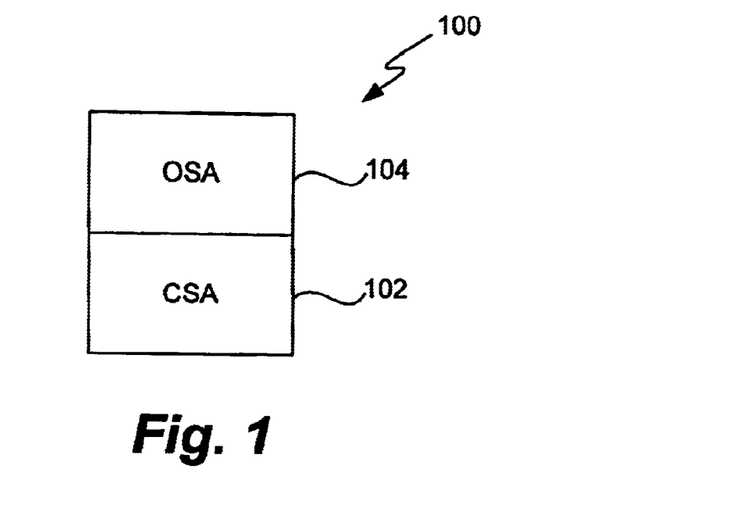
FIG. 1 is a simplified block diagram of an electro-optical module (EOM) in accordance with the present invention.

FIG. 1 is a block diagram describing the structural overview of a typical electro-optic module (EOM) 100 used in a sleeve-based connector. One such example being a miniature form factor connector. The EOM 100 is composed of a semiconductor chip sub-assembly (CSA) 102 that electrically connected to an optical sub-assembly (OSA) 104. The CSA 102 and the OSA 104 operate together to translate optical signals to electrical signals and vice-versa. Depending on the nature of the photonic devices mounted thereon, the OSA 104 can receive and transmit optical signals from and to optical fibers that are connected to the OSA 104.

Some examples of suitable EOM's are described in, U.S. patent application Ser. No. 09/713,367 (Attorney Docket No. NSC1P180), entitled "Miniature Opto-Electric Transceiver," by Peter Deane, filed on Nov. 14, 2000; U.S. patent application Ser. No. 09/922,358 (Attorney Docket No. NSC1P204), entitled "Miniature Semiconductor Package For Opto-Electronic Devices," by Nguyen et al., filed on Aug. 3, 2001; U.S. patent application Ser. No. 09/922,598 (Atty. Docket No. NSC1P205), entitled "Techniques For Joining An Opto-Electronic Module To A Semiconductor Package," by Nguyen et al., filed on Aug. 3, 2001; U.S. patent application Ser. No. 09/922,357 (Attorney Docket No. NSC1P206), entitled "Optoelectronic Package With Dam Structure To Provide Fiber Standoff", by Nguyen et al., filed on Aug. 3, 2001; U.S. patent application Ser. No. 09/922,601 (Attorney Docket No. NSC1P212), entitled "Optical Sub-Assembly For Opto-Electronic Modules," by Mazotti et al., filed on Aug. 3, 2001; U.S. Patent Application (Attorney Docket No. NSC1P212X1), entitled "Ceramic Optical Sub-Assembly For Opto-Electronic Modules", by Liu et al., filed on Nov. 20, 2001; and in U.S. patent application Ser. No. 09/963,039 (Attorney Docket No. NSC1P215), entitled: "Techniques For Attaching Rotated Photonic Devices To An Optical Sub-Assembly In An Optoelectronic Package", by Nguyen et al., filed on Sep. 24, 2001, all of which are incorporated by reference herein.

Figure 2:
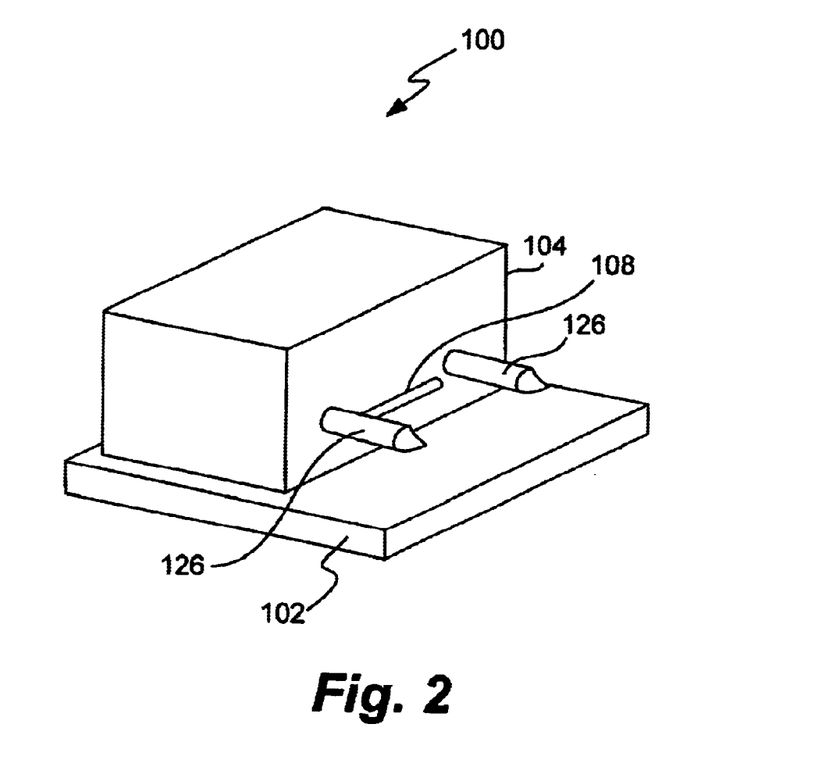
FIG. 2 is a simplified figurative illustration of an electro-optical module (EOM) in accordance with the present invention.

FIG. 2 depicts a perspective view of a simplified embodiment of an EOM 100 of a miniature form factor connector. The depicted CSA 102 can be formed of a variety of semiconductor chip packages that have electrical connection pathways for connection to optical sub-assemblies. For instance, the CSA 102 can be a leadless leadframe package (LLP) that has up-linking contact surfaces that are exposed through the top surface of the LLP. The OSA 104 includes photonic devices 108. The photonic devices 108 can be either optical emitters (e.g., lasers) or detectors. The photonic devices 108 can include a single laser or detector or multiple arrays of such emitters and/or detectors. In a preferred embodiment of the present invention, the photonic devices 108 are arrays of vertical cavity surface emitting lasers (VCSEL's). The details of a suitable CSA formed from an LLP are disclosed in U.S. patent application Ser. No. 09/922,358, entitled "Optoelectronic Package with Dam Structure to Provide Fiber Standoff" (Attorney Docket No. NSC1P204) which is hereby incorporated by reference.

The depicted EOM 100 includes a CSA 102 and an OSA 104. In the depicted embodiment, the OSA 104 includes a block having photonic devices 108 formed on a block face. The OSA 104 also includes alignment pins 126 extending from the block face, the pins 126 being used to align the photonic devices 108 relative to a ferrule that holds optical fibers. The pins 126 extend in a direction normal to the front surface 132 of the block 120. These pins 126 facilitate fine positioning of the photonic devices 108 with respect to optical fibers to be connected to the OSA 104. Additionally, electrical connections are made between the photonic devices 108 and the CSA 102. In one embodiment, the connections are made by electrical contacts formed on a flexible circuitry tape mounted on the block. In one embodiment, the CSA 102 is, for example, an LLP with a molded plastic package and contact leads that protrude from the bottom surface. It should be noted that other methods of establishing electrical contact between the CSA 102 and the photonic devices 108 can be used. For example, etched metal leads can be used.

The depicted photonic devices 108 can comprise arrays of photonic devices (including arrays of optical detectors and arrays of optical emitters). Such combinations of laser emitters and detectors facilitate the use of the optoelectronic module 100 as an optical transceiver. In one example, a 16-channel transceiver may be formed using one 2×4 laser emitter array and one 2×4 detector array. However, in alternative embodiments, if only one array of laser emitters is connected to the OSA 104, the module 100 functions as a transmitter. Likewise, in another alternative embodiment, only one array of detectors is connected to the OSA 104, thereby making the module 100 a receiver. Also alternatively, the OSA 104 can be constructed using only one type of photonic device (e.g., all lasers, all detectors, etc.). Also, embodiments of the invention can be constructed using two-dimensional photonic device arrays comprising M×N photonic devices. Such arrays can be connected to, for example, an M×N array of optical fibers. Thus, the inventors contemplate the implementation of a wide variety of photonic devices and device configurations. Additionally, the inventors contemplate that some embodiments will include the placement of optical elements between the photonic devices and corresponding optical fibers. Such optical elements include, but are not limited to, lenses and optical filters of arrays of such elements.

Optical fibers are optically connected to the photonic devices of the EOM. In order to facilitate this interconnection, a two-component connector is used to interconnect the EOM of a sleeve-based connector with associated optical fibers. On implementation of such a sleeve-based connector uses a miniature form factor connector. One component comprises a connector sleeve which holds the EOM. The other component is a connector "plug" (that contains a ferrule which in turn holds optical fibers) that is fitted into the connector sleeve. The interconnection of the plug with the sleeve positions and optically interconnects the fibers with the photonic devices.

Figure 3A:
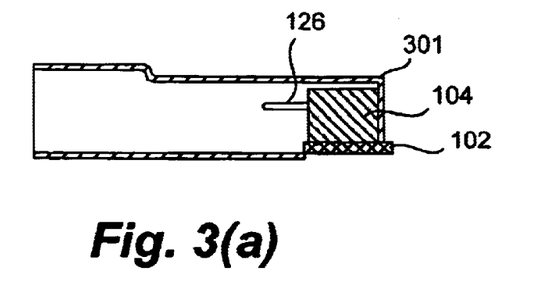
FIGS. 3(a)–3(b) are various views of a connector sleeve embodiment.
Figure 3B:
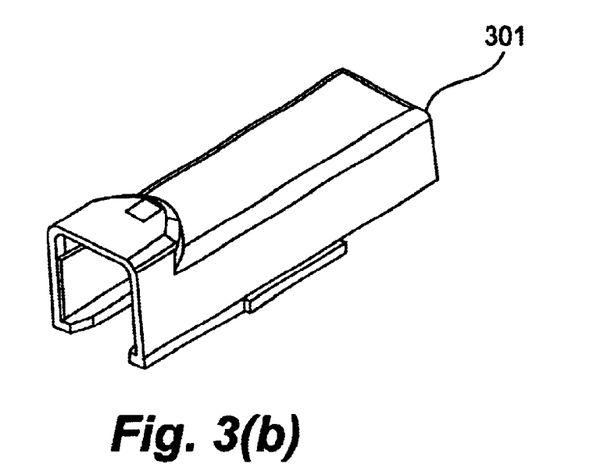

FIG. 3(a) depicts a cross-section view of an embodiment of a connector sleeve 301. The CSA 102, OSA 104, and fine alignment pin 126 are depicted. FIG. 3(b) offers a "top side" perspective view of one embodiment of a connector sleeve 301. It is to be noted that this sleeve 301 embodiment is about 10 mm wide making it much smaller than existing formats such as MTP, MPO, MT-RJ, MT-BP, et cetera.

For more detail regarding certain miniature form factor sleeve embodiments, reference can be made to, for example, U.S. patent application Ser. No. 09/713,367, entitled "Miniature Opto-Electric Transceiver" (Attorney Docket No. NSC1P180) and U.S. patent application Ser. No. 09/922,601, entitled "Optical Sub-Assembly for Opto-Electronic Modules" (Attorney Docket No. NSC1P212), the content of which are incorporated by reference.

The other major component of the two-component connector apparatus is a connector plug that fits together with the previously discussed connector sleeve to optically interconnect the optical fibers with the photonic elements. The connector plug includes a plug body and a ferrule that is slidably positioned in the connector body.

Figure 4:
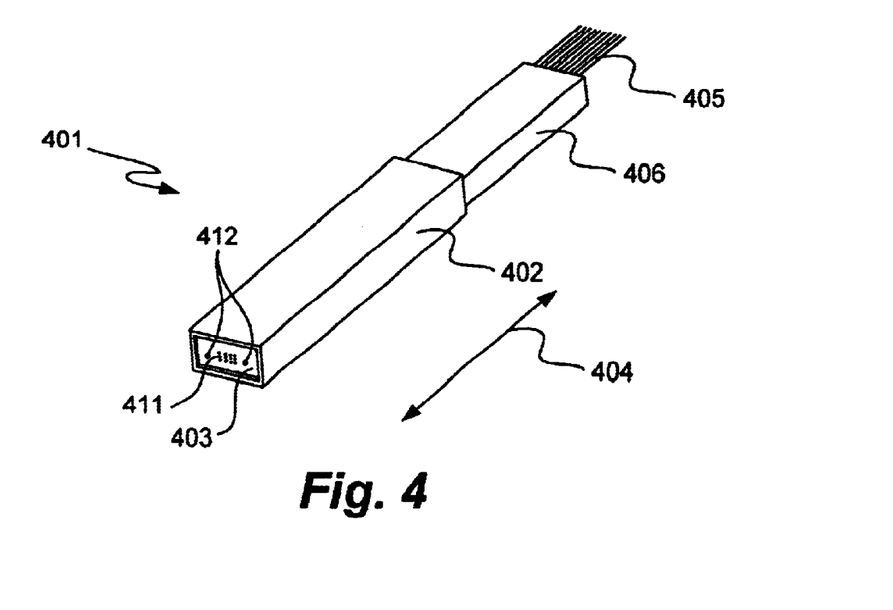
FIG. 4 is perspective view of a ferrule-based miniature form factor connector plug embodiment.

FIG. 4 is a perspective view of a miniature form factor plug embodiment 401 suitable for positioning an optical fiber relative to a photonic device. The depicted embodiment shows a plug body 402, into which the fiber optic ferrule 403 is slidably positioned. The fiber optic ferrule 403 is positioned in the plug body 402 such that it can slide backward and forward in a longitudinal direction (indicated by the arrows 404) relative to the plug body 402. The depicted embodiment shows a fiber optic ribbon 405 holding a plurality of optical fibers. The fiber optic ribbon 405 is held at one end by the ferrule 403 and, in this embodiment, also held in the plug body 402 using a strain relief 406. Also illustrated is the front facing surface of the ferrule 403. This view of the face of the ferrule 403 shows a plurality of optical fibers 411 and a pair of alignment openings 412 (as in FIG. 3(a)).

Figure 5:
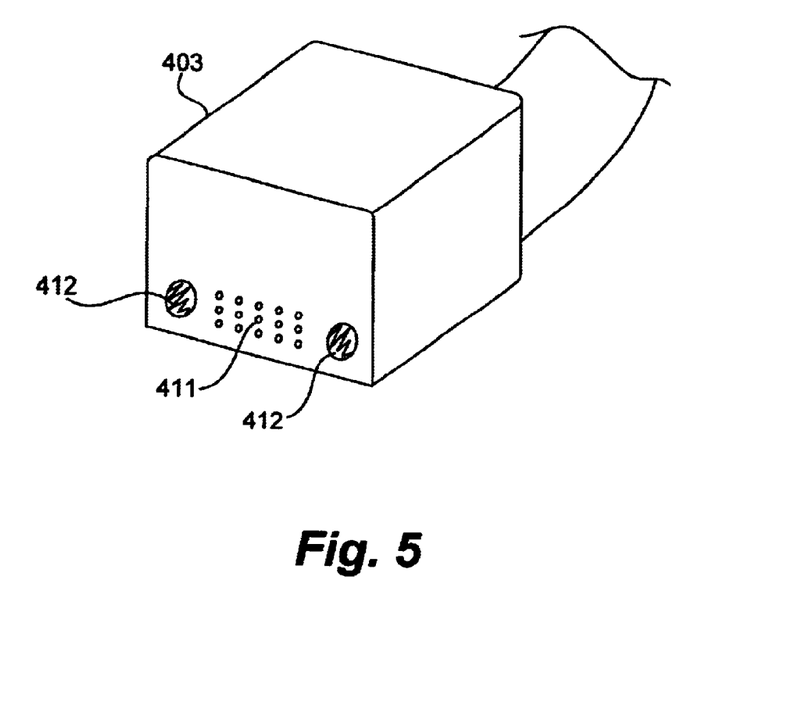
FIG. 5 is a close in perspective view of the ferrule depicted in FIG. 4.

FIG. 5 is a close-up perspective view of a portion of one miniature form factor fiber optic ferrule embodiment 403 that can be slidably positioned inside the plug body 402 of FIG. 4. In the depicted embodiment the ferrule 403 is configured to hold a plurality of optical fibers 411. Such fibers 411 can form part of a fiber optic ribbon 405 or may be a plurality of individual fibers. In some embodiments, the ferrule 701 is positioned to slide back and forth inside the plug body 402. Additionally, the facing surface of the ferrule 403 includes a pair of openings 412 configured to receive the fine alignment pins 126 of the OSA 104 (e.g., FIG. 2). In the depicted configuration, the openings comprise a pair of holes 412. Other configurations for such openings can be used, including, but not limited to configurations having a hole/slot and configuration.

Figure 6:
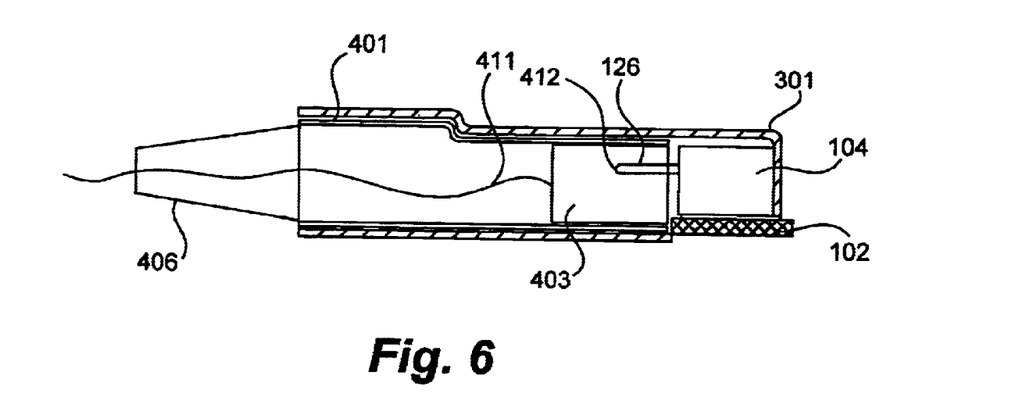
FIG. 6 is a section view of a miniature form factor connector embodiment with the plug and sleeve connected.

FIG. 6 is a section view of a connected miniature form factor connector embodiment. The plug 401 and ferrule 403 assembly is engaged with a connector sleeve 301. The connector sleeve 301 includes the OSA 104 positioned relative to the connector sleeve 301. The CSA 102 is also shown in operative combination with the OSA 104. The cut-away view shows the engagement and alignment of alignment pin 126 (of the OSA 104) with an alignment opening 412 of the fiber optic ferrule 403. The engagement of the alignment pins 126 with the alignment hole 412 helps to define the optical alignment between the optical fibers of the ferrule 403 and the photonic devices of the OSA 104 (not shown here). These and other alignment features define the optical alignment between the optical fibers and the photonic devices so that the optical fibers 411 are positioned at desired distances from the corresponding photonic devices of the OSA 104. When the plug 401 is inserted, both urge the ferrule into the connector sleeve 301 so that the optical fibers are a desired distance away from the photonic devices. Also shown is the strain relief 406.

The above described connectors sleeves are well suited to connect miniature form factor plugs but are too small to connect with older standard ferrule based connectors.

One example of a standard ferrule based parallel multi-mode fiber format is a MPO connector using multi-fiber push-on plugs (MPO plugs). One embodiment of such a MPO connector is shown in FIGS. 7(a)–7(c).

Figure 7A:
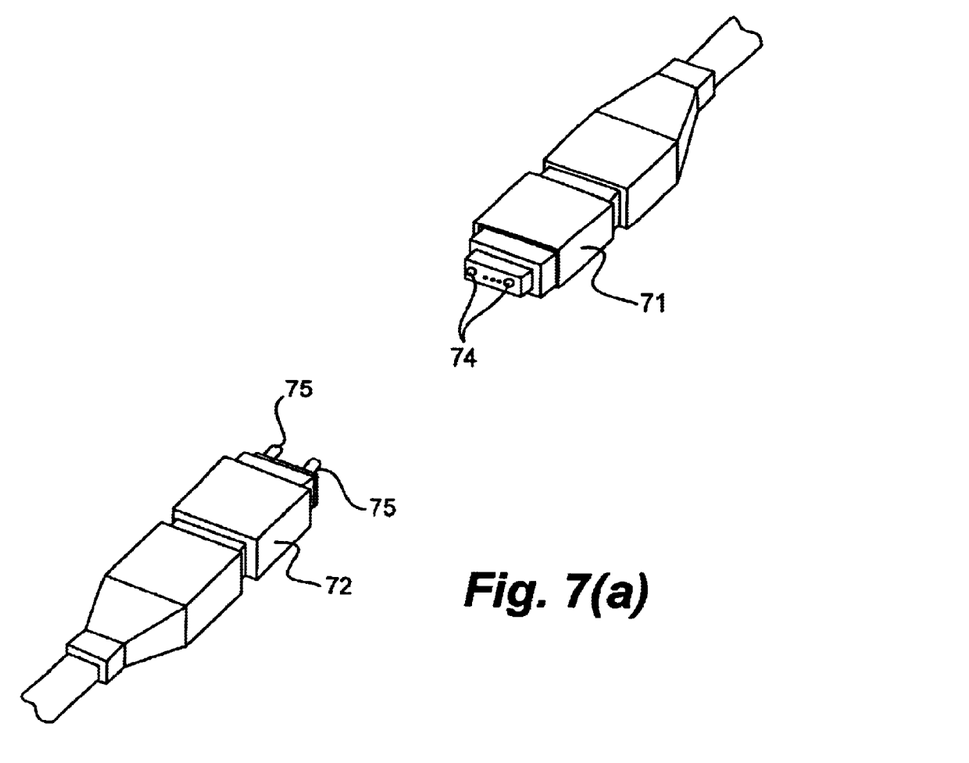
FIG. 7(a) is a perspective view of a standard MPO connector.

FIG. 7(a) is a perspective view of a MPO backplane connector. Such connectors are generally about 19 mm in height and about 13 mm in width. Such connectors can have twelve optical fibers. The depicted embodiment includes two basic components, a first connector plug 71 and a second connector plug 72. The first plug 71 (female) includes a pair of alignment holes 74. The second plug 72 (male) includes a pair of alignment pins 75 that are sized to engage the holes 74 of the first plug 71 as the two plugs 71, 72 are pushed together. The optical faces of the plugs are polished to enhance optical performance.

Figure 7B:
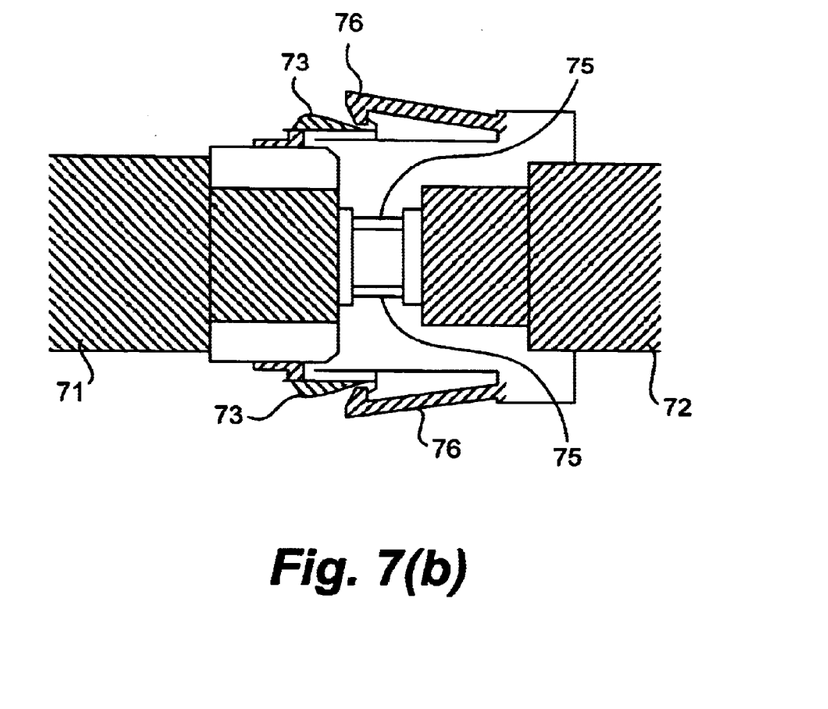
FIGS. 7(b) and 7(c) are section views of an MPO plug connector showing the operation of the latch mechanism.
Figure 7C:
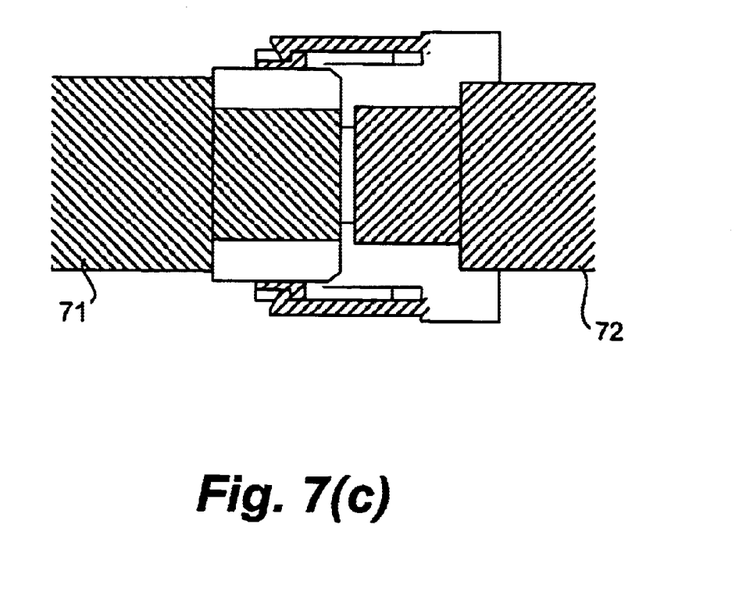

FIGS. 7(b) and 7(c) are side section views of the MPO connector of FIG. 7(a), when used to interconnect on, for example, a circuit board. This view shows engagement latches 73 on the first plug 71. These engagement latches 73 can be used engage locking latches 76 of a connector housing 77. As shown in FIGS. 7(b) and 7(c), the latches 73 and 76 engage with each other as the first connector plug 71 and the second connector plug 72 are pushed toward each other and the alignment pins 75 engage the alignment holes (not shown). FIG. 7(c) shows the first plug 71 fully engaged with the second connector plug 72. The latches 73 and 76 are engaged locking the first plug 71 with the second connector plug 72.

Figure 8A:
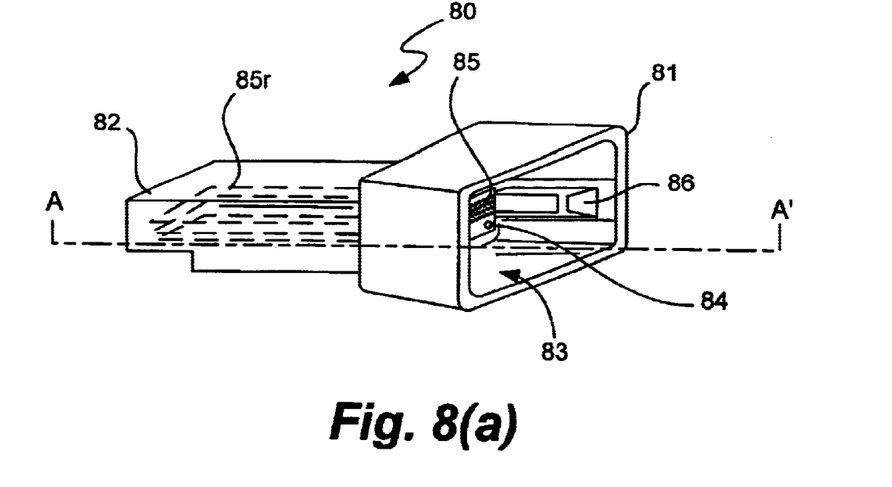
FIG. 8(a) is a perspective view of an adaptor apparatus in accordance with the principles of the present invention.

An embodiment of the present invention is an adaptor for optically interconnecting the optical fibers of a connector plug having a standard format with photonic devices in a connector sleeve wherein the photonic devices and the sleeve are arranged in a miniature form factor format. FIG. 8(a) shows a perspective view of one embodiment of such an adaptor. The adapter includes an adapter jacket 80. The adapter jacket 80 includes a first end 81 and a second end 82. The first end 81 is in optical communication with the second end 82. Typically, this optical communication is facilitated by the presence of one or more fiber ribbons positioned to transmit optical signals from the first end 81 to the second end 82. The first end 81 includes a recess which is sized to receive a connector plug which is constructed in accordance with the standard ferrule-based connector format. As previously discussed, examples of such formats are MPO, MTP, MT-RJ, MT-BP, or other parallel multi-mode fiber formats. By way of example, reference to FIGS. 9(a)–9(d) illustrate four of the many possible standard configurations.

Referring again to FIG. 8(a), the first end 81 includes a recess 83 configured to receive a connector plug. The depicted embodiment is designed to receive a male MPO connector plug. Thus, the recess 83 in the first end 81 also includes a pair of alignment holes 84 (only one of which is shown in this view) for receiving the alignment pins of the MPO connector plug. The second end 82 of the adapter jacket is configured so that it may be inserted into a miniature form-factor connector sleeve and thereby interconnected with an optical sub-assembly positioned therein. Thus, the second end 82 includes a pair of alignment openings (not shown in this view) configured to receive the alignment pins of an optical sub-assembly. These openings can be arranged in the previously discussed hole/slot configuration if desired. When a MPO plug is connected to the first end 81 of the adapter, it is optically connected to a first end of the optical fibers 85 of the fiber ribbons 85r (which pass through the adaptor jacket 80 and are shown by the dashed lines that pass through the adapter jacket 80). Additionally, the inner surface of the recess 83 of the first end 81 may also include a latch 86 for engaging the MPO connector when it is inserted into the adapter 80. This latch 86 will lock the MPO plug in the adapter until such time as it is desired to release the plug. The adaptor is preferably made of materials that are stable at temperatures near 260° C. In one embodiment such adaptors can be made of metal. This will enable the adaptor to withstand exposure to leadfree solder reflow cycles.

Figure 8B:
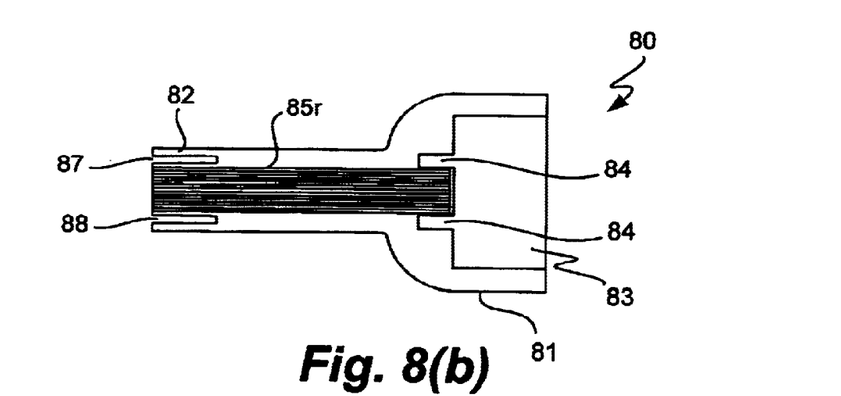
FIG. 8(b) is a section view of the adaptor apparatus shown in FIG. 8(a).

FIG. 8(b) is a sectional view of FIG. 8(a) cut through dashed line A—A'. view of the adapterjacket 80 looking into the first end 81. A fiber ribbon 85r is shown passing through the adapterjacket 80. The first end 81 is designed to receive a male MPO connector plug. Therefore, the recess 83 in the first end 81 also includes a pair of alignment holes 84 for receiving the alignment pins of the male MPO connector plug. The second end 82 is designed to be plugged into a miniature form factor sleeve and engage the alignment pins of an OSA. Therefore, the second end 82 also includes a pair of alignment openings 87, 88 for receiving the alignment pins of the OSA in the sleeve. It is significant to note that the inventor contemplates that the first end 81 is scalable and can be expanded to interconnect with many standard fiber formats. Moreover, although the depicted embodiment shows the first end 81 as having alignment holes 84 for receiving the alignment pins of the MPO plug, other alignment configurations are possible. For example, the alignment holes 84 depicted in FIG. 8(b) could instead be replaced by alignment pins designed to align and interconnect with a female MPO plug which could be inserted into a similar adapter jacket. Additionally, the first end 81 can be configured to engage any of an number of alignment features present on a standard format fiber optic connector plug.

Figure 8C:
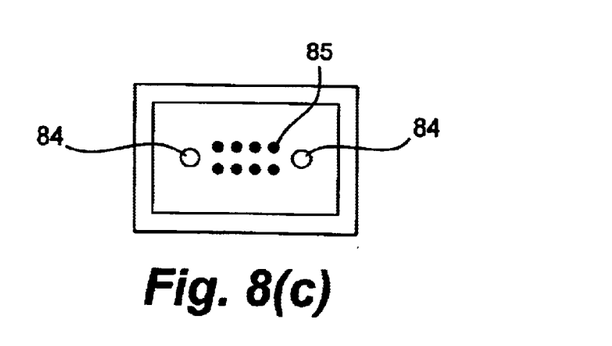
FIG. 8(c) is a face on view of the adaptor apparatus shown in FIG. 8(a).

FIG. 8(c) is a face-on view of the adapter jacket 80 looking into the first end 81. The alignment holes 84 are clearly shown as are the optical fibers 85 of the fiber ribbon. As previously stated, many other standard format arrangements of the optical fibers may be used in accordance with the present invention. Moreover, although the depicted embodiment shows the first end as having alignment holes 84 for receiving the alignment pins of the MPO plug, other configurations are possible. For example, the alignment holes 84 depicted in FIG. 8(c) could instead represent alignment pins designed to align and interconnect with a female MPO plug which could be inserted into the same adapter jacket.

Figure 9A:
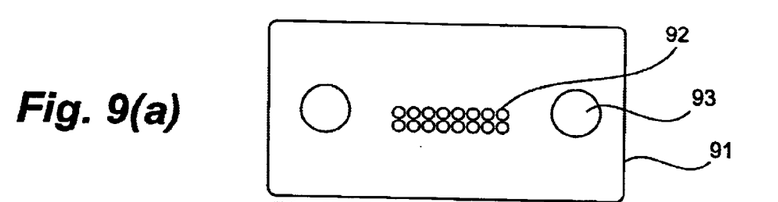
FIGS. 9(a)–9(d) are facing views of a variety of standard format plug connectors.
Figure 9B:
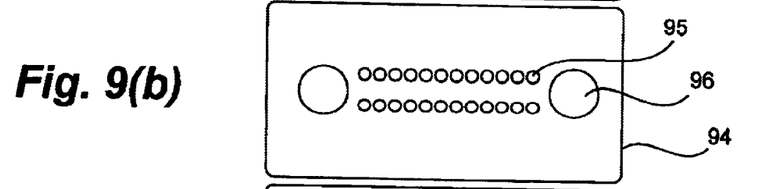
Figure 9C:
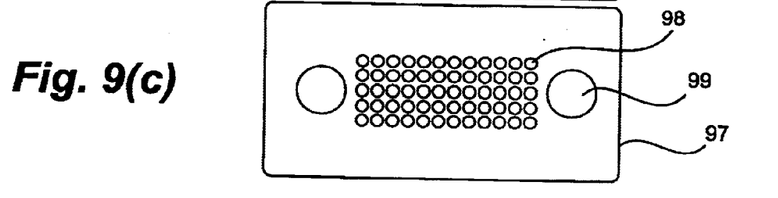
Figure 9D:
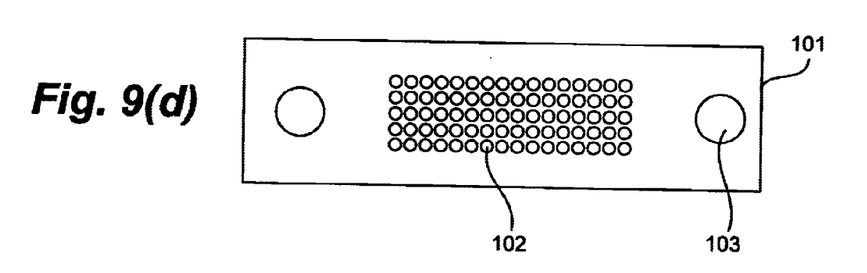

FIGS. 9(a)–9(d) show a just few possible example configurations of standard format plug connectors. FIG. 9(a) shows a "16MT" connector 91 format having sixteen fibers 92 arranged in an eight column by two row fiber array. Such an array has a pitch of 0.25 mm between rows and columns. Also shown are the holes 93 for receiving the alignment pins from the connector plug. FIG. 9(b) shows a "24MT" connector 94 format having twenty-four fibers 95 arranged in a twelve column by two row fiber array. Such an array has a pitch of 0.25 mm between columns and a 0.5 mm pitch between columns. Also shown are the holes 96 for receiving the alignment pins from the connector plug. FIG. 9(c) shows a "60MT" connector 97 format having sixty fibers 98 arranged in an twelve column by five row fiber array. Such an array has a pitch of 0.25 mm between rows and columns. Also shown are the holes 99 for receiving the alignment pins from the connector plug. FIG. 9(d) shows a "80MT" connector 101 format having eighty fibers 102 arranged in a sixteen column by five row fiber array. Such an array has a pitch of 0.25 mm between rows and columns. Also shown are the holes 103 for receiving the alignment pins from the connector plug. These are just a few of the many possible standard formats usable in accordance with the principles of the present invention.

Figure 10A:
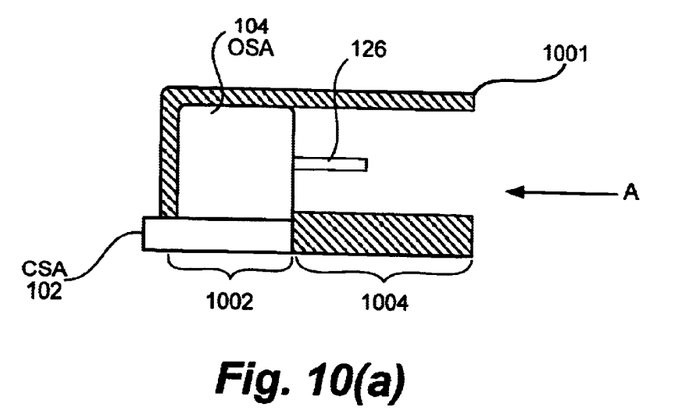
FIG. 10(a) is a section view of a truncated miniature form factor connector sleeve and EOM in accordance with the principles of the present invention.

The adaptor embodiments of the present invention are pushed into place on a miniature form factor sleeve. Then a standard connector plug is connected to the adaptor. Thus, standard format connector plugs can be interconnected with miniature form factor connectors. A connector sleeve, for example, a sleeve such as shown in FIG. 3(b) is used. In one embodiment, the sleeve is truncated to remove the front portion. With reference to FIG. 10(a), one such embodiment is shown. In the sleeve 1001 is fitted a CSA 102 and OSA 104. Also shown are the alignment pins 126 extending from the OSA 104. In use, the second end of an adaptor is inserted (in the direction indicated by arrow A) into the sleeve 1001 to connect with the OSA 104. The sleeve is generally very small. In the depicted embodiment, the portion 1002 of the sleeve where the OSA 104 is positioned is about 10 mm long. The remaining length 1004 of the sleeve is also about 10 mm long.

Figure 10B:
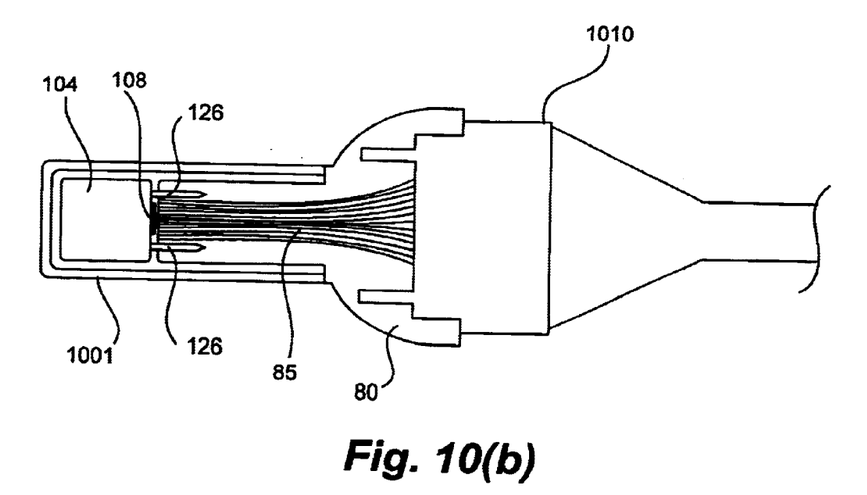
FIG. 10(b) is a section view of showing a standard format plug connected to an adaptor of the present invention and where the adaptor is connected to a miniature form factor connector sleeve and EOM in accordance with the principles of the present invention.

FIG. 10(b) is a section view of a sleeve assembled with an inserted adaptor and showing an MPO plug connector inserted. The embodiment of FIG. 10(b) is shown having an OSA 104 fitted into a truncated sleeve 1001 with an adaptor 80 inserted into the sleeve 1001. The adaptor 80 is shown engaged with the alignment pins 126 of the OSA 104. The fibers 85 of the adaptor 80 are aligned with the photonic devices 108 of the OSA 104. Other alignment features may also be used to align the OSA 104 with the adaptor 80. For example, the adaptor 80 can include an alignment groove similar to that shown in the ferrule of FIG. 4. The alignment groove can engage an alignment projection of the sleeve 1001 (one such alignment projection is depicted in FIG. 3(a)). The engagement of such a groove and projection can help align the adaptor 80 with respect to the photonic devices 108 of the OSA 104. An MPO plug 1010 (or any other standard formatted plug) can be plugged into the adaptor 80. Although shown here as fitted to a truncated sleeve other embodiments of the adaptor can be constructed that can be fitted to non-truncated miniature form factor sleeves.

The adaptor embodiments of the invention can be used for interconnecting optical fibers carried by a connector plug and arranged in a first format with photonic devices arranged in a second format. A method for accomplishing this comprises providing a plug having a plurality of optical fibers arranged in accordance with a first format. The first format is generally a standard ferrule based parallel multi-mode fiber format including, but not limited to MPO, MTP, MTRJ, or other parallel multi-mode fiber formats. The method further includes providing a connector having a plurality of photonic devices arranged in accordance with a second format. In one embodiment, the second format is a miniature form factor format. The method provides an adaptor having a first optical interface configured to optically connect with the plug having plurality of optical fibers arranged in accordance with the first format and having a second optical interface configured to optically connect with the with the plurality of photonic devices arranged in accordance with the second format. Thus, in one embodiment the first optical interface is configured in a first format in accordance with a standard ferrule based parallel multi-mode fiber format including, but not limited to MPO, MTP, MTRJ, or other parallel multi-mode fiber formats and the second optical interface is configured in a second format in accordance with a miniature form factor format. The method includes connecting the optical fibers of the plug to the first optical interface of the adaptor and connecting the second optical interface of the adaptor to the plurality of photonic devices of the connector, thereby optically interconnecting the plurality of photonic devices with the optical fibers.

The present invention has been particularly shown and described with respect to certain preferred embodiments and specific features thereof. However, it should be noted that the above-described embodiments are intended to describe the principles of the invention, not limit its scope. Therefore, as is readily apparent to those of ordinary skill in the art, various changes and modifications in form and detail may be made without departing from the spirit and scope of the invention as set forth in the appended claims. In particular, embodiments of the invention can interconnect a miniature form factor format connector with connector having MPO, MTP, MT-RJ, MT-BP, or other standard ferrule-based parallel multi-mode fiber format plug. Other embodiments and variations to the depicted embodiments will be apparent to those skilled in the art and may be made without departing from the spirit and scope of the invention as defined in the following claims. Further, reference in the claims to an element in the singular is not intended to mean "one and only one" unless explicitly stated, but rather, "one or more".

What is claimed is:

1. An adaptor suitable for optically connecting optical fibers of a connector plug arranged in accordance with a standard ferrule based parallel multi-mode fiber format with photonic devices arranged in a sleeve-based connector sleeve, the adaptor comprising:

an adaptor jacket having a first end and a second end;

the first end being in optical communication with the second end;

the first end configured to receive a connector plug holding a plurality of optical fibers arranged in a standard ferrule based parallel multi-mode fiber format; and the second end being suitable for connection with a connector sleeve having an optical subassembly fitted thereon, the optical subassembly having photonic devices arranged such that the photonic devices are optically coupled, via the adaptor jacket, to corresponding optical fibers of the connector plug.

2. The adaptor of claim 1, wherein the adaptor is further formatted such that the photonic devices arranged in the connector sleeve are arranged in accordance with a miniature form factor format and wherein the second end is configured for connection with a miniature form factor connector sleeve with the optical subassembly having photonic devices arranged in the miniature form factor format such that the photonic devices are optically coupled, via the adaptor jacket, to corresponding optical fibers of the connector plug.

3. The adaptor of claim 2, wherein the optical communication between the first end of the adaptor jacket and the second end of the adaptor jacket is achieved by a optical ribbon comprising a plurality of optical fibers that optically interconnect the first end with the second end and wherein optical coupling between the photonic devices and the optical fibers of the plug is achieved by the optical fibers of the optical ribbon that optically interconnects the first end with the second end.

4. The adaptor of claim 2, wherein the first end is configured to receive a connector plug configured in a format selected from among MPO, MTP, MT-RJ, MT-BP, and parallel multi-mode fiber formats.

5. The adaptor of claim 2, wherein the first end includes a recess configured to receive the connector plug, the recess having a fastener for securing the connector plug in place once the connector plug is introduced into the recess.

6. The adaptor of claim 5, wherein the first end of the adaptor includes an alignment feature which when engaged with a corresponding alignment feature of the connector plug serves to align the connector plug with the first end of the adaptor.

7. The adaptor of claim 5, wherein the first end further includes a pair of alignment holes configured to receive a pair of alignment pins extending from the connector plug.

8. The adaptor of claim 5, wherein the first end further includes a pair of alignment pins configured to engage a pair of alignment holes in the connector plug.

9. The adaptor apparatus of claim 2, wherein the second end of the adaptor jacket includes a pair of openings configured to receive a pair of optical alignment pins that extend from the optical subassembly.

10. The adaptor apparatus of claim 9, wherein the pair of openings in the second end of the adaptor jacket include a hole and a slot configured to receive the pair of optical alignment pins, wherein the engagement of the pair of optical alignment pins with the hole and the slot aligns the optical fiber of the second end of the adaptor jacket with a corresponding photonic device.

11. An adaptor apparatus suitable for facilitating the optical interconnection of optical fibers arranged in a standard format connector plug with photonic devices arranged in miniature form factor format on an optical subassembly of a miniature form factor connector sleeve, the adaptor apparatus comprising:

an adaptor jacket having a first end and a second end;

the first end of the adaptor jacket configured to receive a standard format connector plug that holds plug optical fibers in standard connector format arrangement;

the second end of the adaptor jacket suitable for connection with a miniature form factor connector sleeve; and the first end of the adaptor jacket being optically connected to the second end of the adaptor jacket using an optical ribbon that includes a plurality of optical fibers, said plurality of optical fibers being arranged at the second end of the adaptor jacket in accordance with a miniature form factor format to optically interface with photonic devices arranged in the same miniature form factor format and arranged at the first end of the adaptor jacket in accordance with a standard format to optically interface with optical fibers arranged in the same standard format in a connector plug, whereby the plurality of optical fibers of the optical ribbon transmit light between the photonic devices and corresponding optical fibers of the plug.

12. The adaptor apparatus of claim 11, wherein the second end of the adaptor jacket includes a pair of openings configured to receive a pair of optical alignment pins that extend from the optical subassembly.

13. The adaptor apparatus of claim 12, wherein the pair of openings in the second end of the adaptor jacket include a hole and a slot configured to receive the pair of optical alignment pins, wherein the engagement of the pair of optical alignment pins with the hole and the slot aligns the photonic devices of the optical subassembly with the corresponding optical fibers of the optical ribbon of the second end of the adaptor jacket.

14. The adaptor apparatus of claim 12, wherein the second end of the adaptor jacket includes an alignment groove suitable for engaging an alignment projection of the miniature form factor connector sleeve so that when the adaptor is connected with the miniature form factor connector sleeve the groove engages with the alignment projection to laterally align the adaptor jacket relative to photonic devices of the optical subassembly.

15. The adaptor apparatus of claim 12, wherein the first end of the adaptor jacket includes a recess suitable for the insertion of a standard format connector plug.

16. The adaptor apparatus of claim 15, wherein the recess in the first end of the adaptor jacket includes a fastener that engages with the standard format connector plug when the plug is inserted into the recess.

17. The adaptor apparatus of claim 15, wherein the recess in the first end further includes a pair of alignment holes configured to receive a pair of alignment pins extending from the connector plug.

18. The adaptor apparatus of claim 15, wherein the recess in the first end further includes a pair of alignment pins configured to engage a pair of alignment holes in the connector plug.

19. A method for interconnecting optical fibers carried by a connector plug and arranged in a first format with photonic devices arranged in a second format, the method comprising:

providing a plug having a plurality of optical fibers arranged in accordance with a first format;

providing a connector having a plurality of photonic devices arranged in accordance with a second format;

providing an adaptor having a first optical interface configured to optically connect with the plug having plurality of optical fibers arranged in accordance with the first format and having a second optical interface configured to optically connect with the with the plurality of photonic devices arranged in accordance with the second format;

connecting the plurality of optical fibers of the plug to the first optical interface of the adaptor; and connecting the second optical interface of the adaptor to the plurality of photonic devices of the connector, thereby optically interconnecting the plurality of photonic devices arranged in a second format with the plurality of optical fibers carried by a connector plug and arranged in a first format.

20. A method as in claim 19, wherein the second format comprises a miniature form factor format and wherein the first format comprises a standard connector format.

21. A method as in claim 20, wherein the standard connector format comprises a format selected from among MPO, MTP, MTRJ, and parallel multi-mode fiber formats.

* * * * *